US012596910B2

(12) United States Patent
Tagomori

(10) Patent No.: US 12,596,910 B2
(45) Date of Patent: Apr. 7, 2026

(54) INFORMATION PROCESSING DEVICE FOR IMPROVING QUALITY OF GENERATOR OF GENERATIVE ADVERSARIAL NETWORK (GAN)

(71) Applicant: NOMURA RESEARCH INSTITUTE, LTD., Tokyo (JP)

(72) Inventor: Teruhiro Tagomori, Irvine, CA (US)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 840 days.

(21) Appl. No.: 17/880,336

(22) Filed: Aug. 3, 2022

(65) Prior Publication Data

US 2024/0046068 A1 Feb. 8, 2024

(51) Int. Cl.
*G06N 3/045* (2023.01)
*G06F 18/21* (2023.01)
*G06F 18/2431* (2023.01)

(52) U.S. Cl.
CPC ........... *G06N 3/045* (2023.01); *G06F 18/217* (2023.01); *G06F 18/2431* (2023.01)

(58) Field of Classification Search
CPC .......... G06N 3/045; G06N 3/094; G06N 3/09; G06N 3/048; G06N 3/0475; G06N 3/0464; G06F 18/217; G06F 18/2431; G06F 18/24
See application file for complete search history.

(56) References Cited

U.S. PATENT DOCUMENTS

2020/0311932 A1* 10/2020 Hooper .............. G06F 18/2413

OTHER PUBLICATIONS

N. Liang, L. Yuan, X. Wen, H. Xu and J. Wang, "End-To-End Retina Image Synthesis Based on CGAN Using Class Feature Loss and Improved Retinal Detail Loss," in IEEE Access, vol. 10, pp. 83125-83137, 2022. (Year: 2022).*
S. Zheng and C. Gupta, "Trace Norm Generative Adversarial Networks for Sensor Generation and Feature Extraction," ICASSP 2020-2020 IEEE International Conference on Acoustics, Speech and Signal Processing (ICASSP), Barcelona, Spain, 2020, pp. 3187-3191 (Year: 2020).*
Y. Yang, H. Wang, H. Qiu, J. Wang and Y. Wang, "Non-Convex Sparse Deviation Modeling Via Generative Models," ICASSP 2021-2021 IEEE International Conference on Acoustics, Speech and Signal Processing (ICASSP), Toronto, ON, Canada, 2021, pp. 2345-2349 (Year: 2021).*

(Continued)

*Primary Examiner* — Cheyne D Ly
(74) *Attorney, Agent, or Firm* — RANKIN, HILL & CLARK LLP

(57) ABSTRACT

An information processing device executes learning a generative model that generates data belonging to a designated class on the basis of a noise vector and the designated class by executing a learning algorithm of a conditional generative adversarial network, learning a classification model that classifies input data based on whether the input data is in the designated class, and determining whether a property is satisfied when the classification model classifies an output of the generative model by executing a formal verification algorithm. The property indicates that the generative model does not generate data classified into a class different from a first class designated for the generative model, within a range of a certain norm of a noise vector input to the generative model.

5 Claims, 12 Drawing Sheets

(56) References Cited

OTHER PUBLICATIONS

O. Noakoasteen, J. Vijayamohanan, A. Gupta and C. Christodoulou, "Antenna Design Using a GAN-Based Synthetic Data Generation Approach," in IEEE Open Journal of Antennas and Propagation, vol. 3, pp. 488-494, 2022 (Year: 2022).*

Extended European Search Report (EESR) dated Jan. 9, 2024 issued in European patent application No. 23180575.5.

Augustus Odena et al., "Conditional Image Synthesis With Auxiliary Classifier GANs", Jan. 1, 2017, Retrieved from the Internet: URL: https://arxiv.org/pdf/1610.09585v3.pdf [retrieved on Dec. 21, 2023]; Cited in EESR.

Mirza et al., "Conditional Generative Adversarial Nets", arXiv, Nov. 2014, URL: https://arxiv.org/abs/1411.1784, total 7 pages; Cited in Specification.

* cited by examiner

| DATA ID | IMAGE DATA | CORRECT ANSWER LABEL (CLASS) | DATA TYPE |
|---------|------------|------------------------------|-----------|
| D001 | xxx1.jpg | 0 (VEHICLE A) | LEARNING DATA |
| D002 | xxx2.jpg | 1 (VEHICLE B) | LEARNING DATA |
| D003 | xxx3.jpg | 10 (PERSON) | TEST DATA |
| D004 | xxx4.jpg | 11 (DOG) | LEARNING DATA |
| ... | ... | ... | ... |

FIG. 12

| MODEL ID | WEIGHTING FACTOR | HYPERPARAMETER | NOISE DATA SET 1 (NOISE VECTOR, NORM, CLASS) | ... | NOISE DATA SET n (NOISE VECTOR, NORM, CLASS) |
|---|---|---|---|---|---|
| M001 | [[a1,a2,a3,....], []... | x,y,z,... | $(z11, \; \varepsilon 11, \; c11)$ | | $(z1n, \; \varepsilon 1n, \; c1n)$ |
| M002 | [[b1,b2,b3,....], []... | x,y,z,... | $(z21, \; \varepsilon 21, \; c21)$ | | $(z2n, \; \varepsilon 2n, \; c2n)$ |
| M003 | ... | m,n,o,... | ... | | ... |
| M004 | [[d1,d2,d3,....], []... | m,n,o,... | $(z31, \; \varepsilon 31, \; c31)$ | | $(z3n, \; \varepsilon 3n, \; c3n)$ |
| ... | ... | ... | ... | ... | ... |

332

INFORMATION PROCESSING DEVICE FOR IMPROVING QUALITY OF GENERATOR OF GENERATIVE ADVERSARIAL NETWORK (GAN)

BACKGROUND OF THE INVENTION

1. Technical Field

The present invention relates to an information processing device that improves quality of a generator of a generative adversarial network (GAN).

2. Description of the Related Art

In recent years, as one of deep learning techniques, a technique called GAN is known, which enables generation of non-existent data with higher quality than before by adversarial learning of a generative model (generator) and a discrimination model (discriminator).

A randomly generated noise vector is given as an input to a generator of a general GAN. For example, in a case where a noise vector is given to a generator learned to generate an image on which any of handwritten numbers 0 to 9 is written, for example, the generator generates an image on which any of numbers 0 to 9 is written. In this case, a user cannot designate which number is written in the generator to generate the image.

To solve such a problem, there has been proposed a conditional generative adversarial network (conditional GAN, also simply CGAN) capable of controlling a generator so as to give class information as an input of the generator in addition to a noise vector to generate data classified in a designated class (Mehdi Mirza and another author, "Conditional Generative Adversarial Nets", arXiv, Nov. 6, 2014, URL: https://arxiv.org/abs/1411.1784).

When the noise vector and the class are input to the generator of the CGAN, data that will belong to the designated class is generated, but whether data of the designated class can be generated depends on the quality of the generator. That is, depending on the quality of the generator, in a case where the user designates a specific class and causes data to be generated, data may be generated such that a classification model (capable of performing correct classification) classifies the generated data into a class different from the specific class.

SUMMARY OF THE INVENTION

The present invention has been made in view of the above problems, and realizes a technique for improving accuracy of generating data of a designated class in a case of generating data using a conditional GAN.

To solve this problem, an information processing device of the present invention has the following configuration, for example. That is, an information processing device includes:

one or more processors; and a memory including one or more programs, in which the one or more programs causes, when executed by the one or more processors, the information processing device to execute:

learning a generative model that generates data belonging to a designated class on the basis of a noise vector and the class, by executing a learning algorithm of a conditional generative adversarial network;

learning a classification model that classifies input data based on whether the input data is in the designated class; and determining whether a property is satisfied when the classification model classifies an output of the generative model by executing a formal verification algorithm, and in which the property is that the generative model does not generate data classified into a class different from a first class designated for the generative model, within a range of a certain norm of a noise vector input to the generative model.

According to the present invention, it is possible to improve accuracy of generating data of a designated class in a case of generating data using a conditional GAN.

BRIEF DESCRIPTION OF THE DRAWINGS

FIG. 1 is a diagram for describing an outline of an information processing system according to an embodiment of the present invention;

FIG. 4 is a diagram for describing processing of a learning stage of a CGAN;

FIG. 6 is an example (1) for describing a case where formal verification is applied to a regression model;

FIG. 7 is an example (2) for describing a case where formal verification is applied to a regression model;

FIG. 11 is a diagram illustrating an example of a data structure of learning data and test data according to the present embodiment; and FIG. 12 is a diagram illustrating an example of a data structure of model data according to the present embodiment.

DETAILED DESCRIPTION

Figure 2:
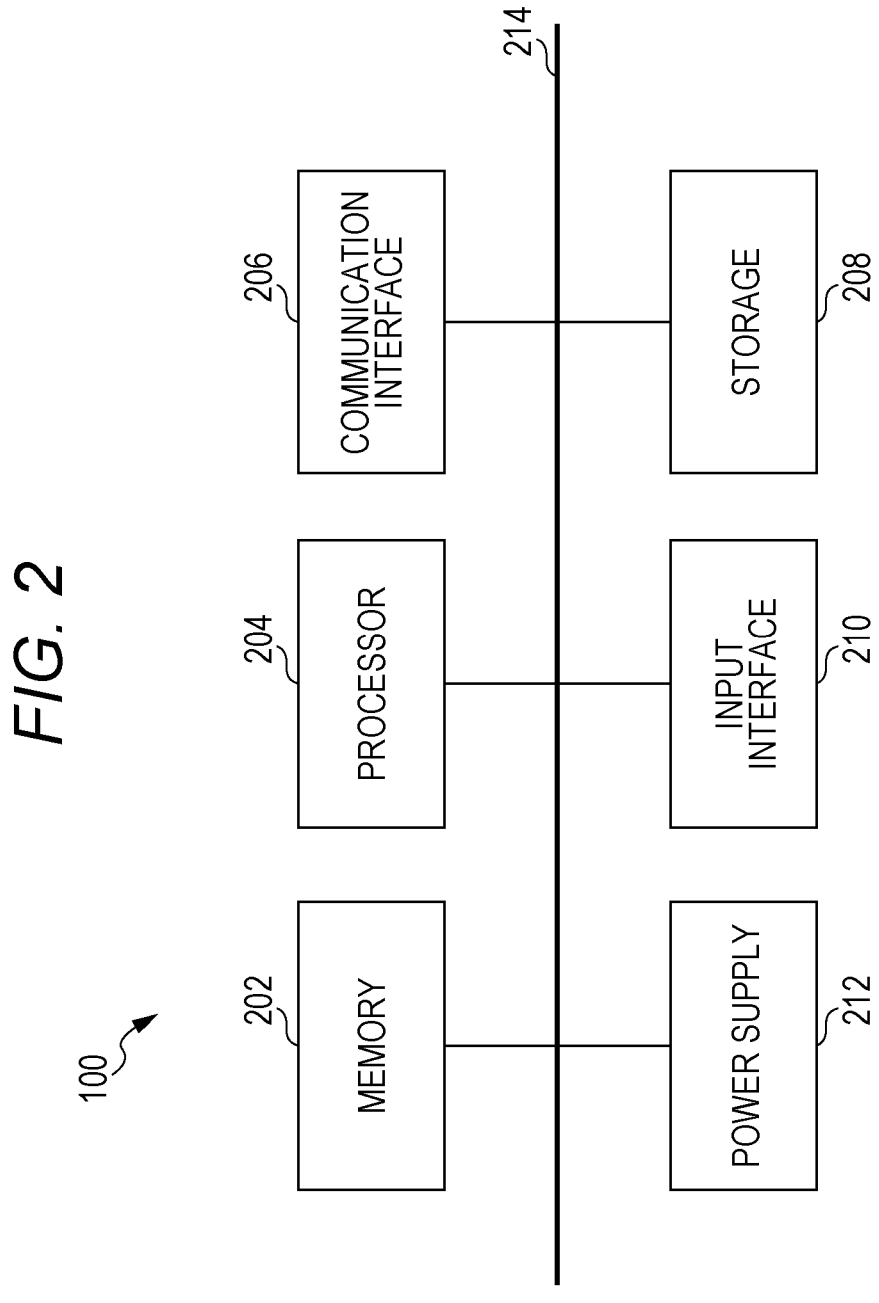
FIG. 2 is a block diagram illustrating a hardware configuration example of an information processing device according to the present embodiment.

An embodiment will be described in detail below with reference to the accompanying drawings. Note that the following embodiment does not limit the invention according to the claims, and all combinations of features described in the embodiment are not necessarily essential to the invention. Two or more features of the plurality of features described in the embodiment may be discretionarily combined. In addition, the same or similar configurations are denoted by the same reference numerals, and redundant description will be omitted.

<Outline of Information Processing System>

Figure 1:
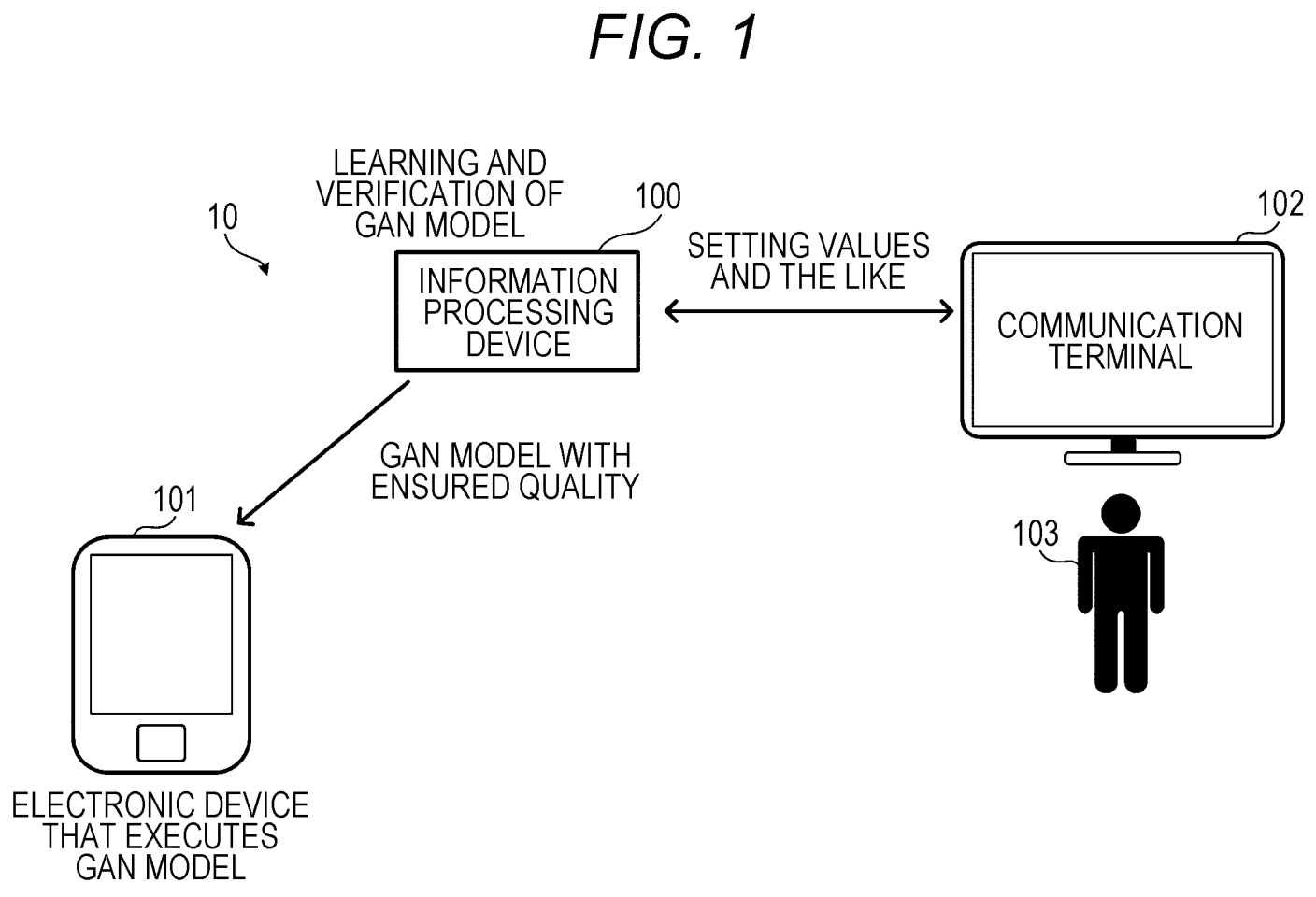

An example of an information processing system according to the present embodiment will be described with reference to FIG. 1. An information processing system 10 includes, for example, an information processing device 100, an electronic device 101, and a communication terminal 102, each of which can communicate via a network. The information processing device 100 generates a learned generative model (also referred to as a verified CGAN) that has undergone CGAN learning and formal verification by executing GAN accuracy enhancement processing. The GAN accuracy enhancement processing, CGAN learning, and formal verification will be described below. The information processing device 100 can be, for example, a server, but may be an edge node arranged on the network. In the present embodiment, a case where a server device is configured by one computer will be described as an example for simplicity of description, but the server device may be configured by a plurality of computers or may be embodied by a virtual machine operating on a host.

The communication terminal 102 is a communication terminal by which a user 103 designates data and setting values necessary for the GAN accuracy enhancement processing, or the user 103 uploads necessary data such as, for example, learning data to the information processing device 100. The communication terminal 102 is, for example, a personal computer, but may be a tablet device or a smartphone.

The electronic device 101 is an electronic device in which the generative model learned and verified by the GAN accuracy enhancement processing is arranged. The electronic device 101 executes processing of an inference stage of the generative model to generate data of an image or the like, for example. For example, the electronic device 101 may download the verified CGAN from the information processing device 100 in response to an instruction of the user or in response to occurrence of a specific trigger of a system update or the like. The example in FIG. 1 illustrates a case where the electronic device 101 is, for example, a mobile device, but the electronic device may be another electronic device that performs data generation processing. The electronic device 101 is not limited to the device that downloads the verified CGAN, and may be another server (for example, a web application server) incorporating the verified CGAN. In a case where the information processing device 100 is constructed on a platform of a cloud service, the electronic device 101 may be a device other than the information processing device 100 on the platform. Furthermore, the present embodiment is not limited to the example in which the electronic device 101 executes the processing of the inference stage of the verified CGAN, and the information processing device 100 may perform the processing of the inference stage of the verified CGAN (in addition to the GAN accuracy enhancement processing) instead of the electronic device 101.

Although details will be described below, learning and formal verification of the CGAN model are performed by performing the GAN accuracy enhancement processing according to the present embodiment. Therefore, the verified CGAN, that is, the generative model (generator) verified by the GAN accuracy enhancement processing ensures generation of data that a classification model classifies into the designated class (accuracy of generation of data that is classified into the designated class is improved).

In general, the generative model generated by the GAN can generate data that does not exist, which is based on characteristics of the learning data. Due to such characteristics, the generative model of the GAN is expected to be used for, as an example, generation of learning data of a machine learning model whose real data is difficult to obtain. The learning data whose real data is difficult to obtain includes, for example, image data used in a medical field. Since the GAN accuracy enhancement processing according to the present embodiment can ensure the generation of data that the classification model classifies into the designated class, it is possible to generate data that matches the designated class with high accuracy even in a field where high accuracy is inevitably required for the quality of learning data because the learning data can be related to human life such as medical care. For example, it is possible to generate learning data for a machine learning model that estimates the presence or absence of a predetermined disease on the basis of an inspection image or estimates a disease name of a patient. Furthermore, the GAN accuracy enhancement processing according to the present embodiment can be used for generation of learning data for learning a machine learning model used for automated driving, learning data for learning a machine learning model used for disaster response, or learning data for learning a machine learning model used for construction, inspection, or the like of a large building such as a bridge or a road. Note that these examples of the learning data are examples of data generated by the generative model verified by the GAN accuracy enhancement processing according to the present embodiment, and a scene to which the verified generative model according to the present embodiment can be applied is not limited to the above-described examples. For example, data generated by the generative model may be used not only as learning data but also as it is as output data in various fields.

Hardware Configuration Example of Information Processing Device

A hardware configuration example of the information processing device 100 will be described with reference to FIG. 2. The information processing device 100 includes a memory 202, a processor 204, a communication interface 206, a storage 208, and an input interface 210. These elements are each connected to a bus 214 and communicate with one another via the bus 214.

The memory 202 is, for example, a volatile storage medium such as a DRAM, and temporarily stores data and programs. In addition, the storage 208 is a non-volatile storage medium that permanently stores data and programs. The storage 208 may be, for example, a semiconductor memory or a hard disk. The storage 208 can store learning data for learning a neural network to be described below, test data for testing the learned neural network, and various data necessary for executing formal verification.

The processor 204 includes, for example, an arithmetic circuit such as a central processing unit (CPU). The processor 204 may be configured by one or more processors. The processor 204 may further include an arithmetic circuit (for example, a GPU) and dedicated hardware for executing statistical processing such as machine learning at a higher speed, and may include a memory therein. The processor 204 implements various functions of the information processing device 100 by expanding and executing a program stored in the storage 208 to the memory 202.

The communication interface 206 is an interface for transmitting and receiving data to and from a device outside the information processing device 100. The communication interface 206 may include a communication circuit capable of communicating in a communication scheme conforming to various standards. The communication interface 206 is connected to a network and exchanges data with the communication terminal 102 or the electronic device 101 via the network. The input interface 210 is, for example, a device for receiving an input from an administrator of the information processing device 100, but may not be provided.

A power supply 212 is a circuit or a module for providing power for operating each unit of the information processing device 100. The power supply 212 may include a battery.

<Outline of GAN Accuracy Enhancement Processing>

An outline of CGAN accuracy enhancement processing according to the present embodiment will be described before describing a functional configuration example of the information processing device.

Figure 4:
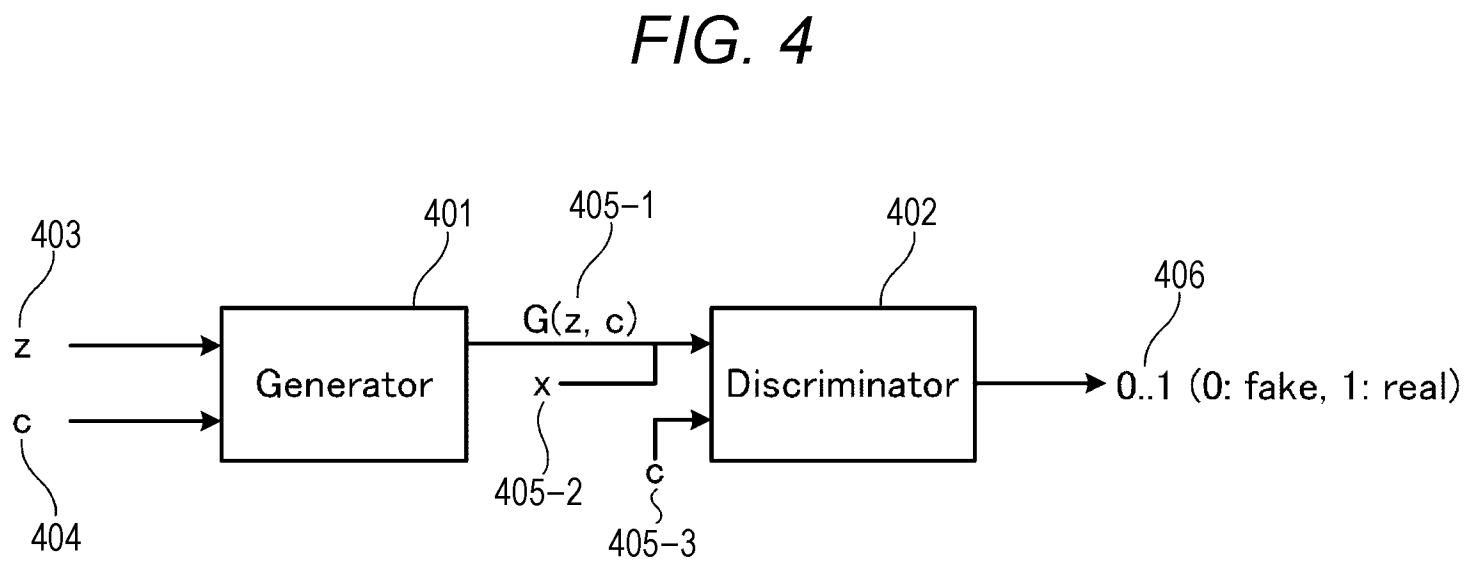

A conditional GAN (CGAN) has, for example, the configuration illustrated in FIG. 4 and includes a generator 401 and a discriminator 402. The generator 401 and the discriminator 402 respectively include, for example, separate deep neural networks. The generator 401 functions as the generative model, and the discriminator 402 functions as the discrimination model. A noise vector z and a class vector c designating a class of data to be generated by the generator 401 are input to the generator 401. The generator 401 generates data on the basis of the noise vector z and the class vector c. The generated data is output as a product G(z, c). Here, the product G(z, c) generated by the generator 401 is "fake" data that is fake. Data x405-2 as real data "real" such as data obtained in a real world or data to be discriminated that is a "fake" product G(z, c) 405-1, and a class vector c405-3 are input to the discriminator 402, for example, and the discriminator 402 discriminates whether the data to be discriminated is "real" or "fake". The discriminator 402 outputs, for example, a discrimination signal 406 represented by 0 to 1. The discrimination signal 406 is, for example, a numerical value in which 1 is a numerical value corresponding to "real" and 0 is a numerical value corresponding to "fake", and for example, the value of the discrimination signal 406, which is closer to 0, represents "fake". In the CGAN learning, the discriminator 402 is learned such that the output discrimination signal 406 correctly discriminates the input data to be discriminated (that is, so as to reduce an error between a correct attribute "real" or "fake" of the input data and the output). On the other hand, the generator 401 is learned to generate data that will be erroneously discriminated by the discriminator 402 (that is, so as to increase an error between the output from the discriminator 402 and "real" or "fake"). When the learning is completed, the discriminator 402 becomes unnecessary, and only the learned generator 401 is used.

In a learned CGAN generator, whatever noise vector z on a noise vector space is given, it is desirable to generate the product G(z, c) classified into the class set in the class vector c, but it is difficult to generate such a complete generator. However, although there is a possibility that the classification model that performs the above classification performs erroneous classification, here, the classification model is assumed to be a model that can correctly perform classification with sufficiently high accuracy. Therefore, the GAN accuracy enhancement processing according to the present embodiment ensures that an output that the classification model classifies into another class is not generated within a range of a certain norm of the noise vector z that has been an input of the product G(z, c) of the generator classified by the classification model with a high score. The norm can represent its size by a radius from z in a case where the noise vector z is arranged in a two-dimensional space, for example. That is, if it is verified that the generator does not generate an output the classification model classifies into another class, using a noise generated within the range of the norm in a case where the user determines how large the norm is to be used by setting or the like, it is possible to ensure that data classified into another class is not generated within the range of the norm.

Figure 5:
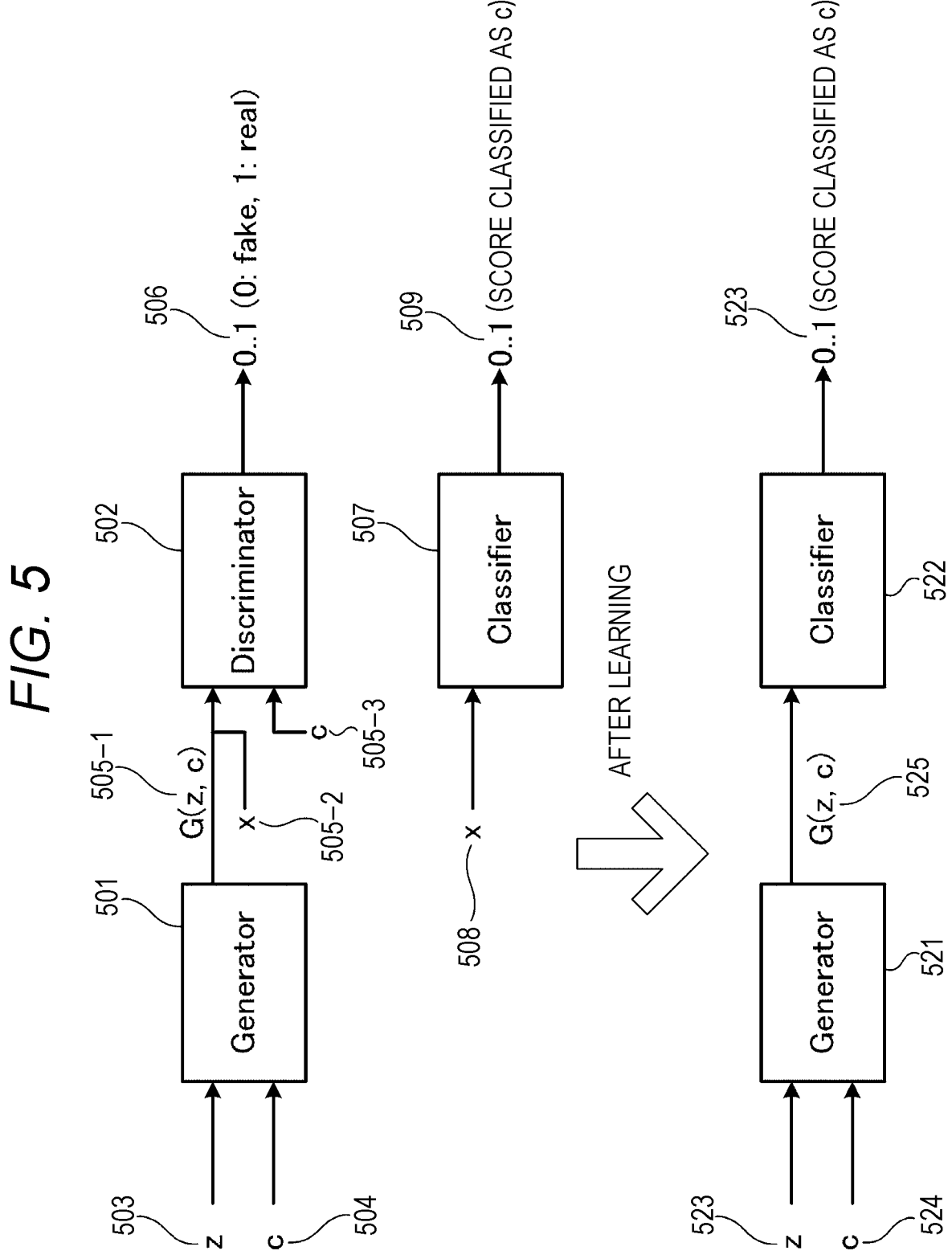
FIG. 5 is a diagram for describing processing of a learning stage and an inference stage of a model of the present embodiment using the CGAN and a classification model according to the present embodiment.

A model used in the GAN accuracy enhancement processing according to the present embodiment will be described with reference to FIG. 5. In the GAN accuracy enhancement processing, a classification model (classifier) is prepared separately from the discriminator used at the time of CGAN learning, and whether data generated by the generator is classified into a correct class by the classification model is verified by a formal method. This ensures that the learned generator generates data that the classification model classifies into the designated class (that is, ensures the quality of the generator).

Specifically, the GAN accuracy enhancement processing includes CGAN learning and classifier learning in processing of a learning stage of a learning model. Then, when the processing of the learning stage is completed, formal verification is executed using the learned generator and classifier.

The configuration of the CGAN includes, for example, a configuration similar to the configuration illustrated in FIG. 4. That is, the CGAN of the present embodiment includes a generator 501 and a discriminator 502. The generator 501 and the discriminator 502 respectively include, for example, separate deep neural networks. The generator 501 functions as the generative model, and the discriminator 502 functions as the discrimination model. A noise vector z503 and a class vector c504 designating a class of data to be generated by the generator 501 are input to the generator 501. The generator 501 generates data on the basis of z503 and c504. The generated data is output as a product G(z, c). Here, the product G(z, c) generated by the generator 501 is "fake" data that is fake. Data x505-2 as real data "real" or data to be discriminated that is a "fake" product G(z, c) 505-1, and a class vector c505-3 are input to the discriminator 502, for example, and the discriminator 502 discriminates whether the data to be discriminated is "real" or "fake". The discriminator 502 outputs, for example, the discrimination signal 406 represented by 0 to 1. The discrimination signal 506 is, for example, a numerical value in which 1 is a numerical value corresponding to "real" and 0 is a numerical value corresponding to "fake", and for example, the value of the discrimination signal 506, which is closer to 0, represents "fake".

The CGAN learning is similar to the learning method described with reference to FIG. 4. That is, the discriminator 502 is learned such that the output discrimination signal 506 correctly discriminates the input data to be discriminated (that is, so as to reduce an error between a correct attribute "real" or "fake" of the input data and the output). On the other hand, the generator 501 is learned to generate data that will be erroneously discriminated by the discriminator 502 (that is, so as to increase an error between the output from the discriminator 502 and "real" or "fake"). When the learning is completed, the discriminator 502 becomes unnecessary.

In the GAN accuracy enhancement processing, a classifier 507 is used. The classifier 507 is configured by, for example, a deep neural network, and functions as a classification model. In the learning of the classifier 507, real data x508 is input to the classifier 507, and the classifier 507 outputs a class into which the real data x508 is classified and a score (for example, a numerical value of 0 to 1) classified into the class. FIG. 5 illustrates, to simplify the drawing, an example in which a score classified as the class c is output in a case where the classifier 507 classifies the real data x508 into the class c.

In the learning of the classifier 507, the classifier 507 is learned so as to output a high score for a correct class on the basis of the output of the classifier 507 when the real data x508 is input and a correct answer data indicating the class of the real data x.

When the learning of the generator 501 and the classifier 507 is completed, the formal verification is performed using the learned generator 501 and classifier 507. A noise vector z523 and a class vector c524 designating a class of data to be generated are input to the generator 501. The noise vector z523 is a noise vector that is within a range of a certain norm from a specific noise vector $z_1$. The product G(z, c) 525 is data generated by the learned generator 521, is input to the classifier 522, and is classified by the classifier 522. The classifier 522 outputs a class into which the product 525 is classified and a score (for example, a numerical value of 0 to 1) classified into the class. As described above, FIG. 5 illustrates, to simplify the drawing, an example in which a score classified into the class c is output in a case where the classifier 522 classifies the product 525 into the class c.

In this way, when using a learned model in the inference stage, if a noise vector is randomly generated and input within the range of the verified noise vector (within the range of a certain norm of the noise vector), it is possible to ensure that the verified generator 521 generates data that is correctly classified by the classification model including the classifier 522.

Figure 6:
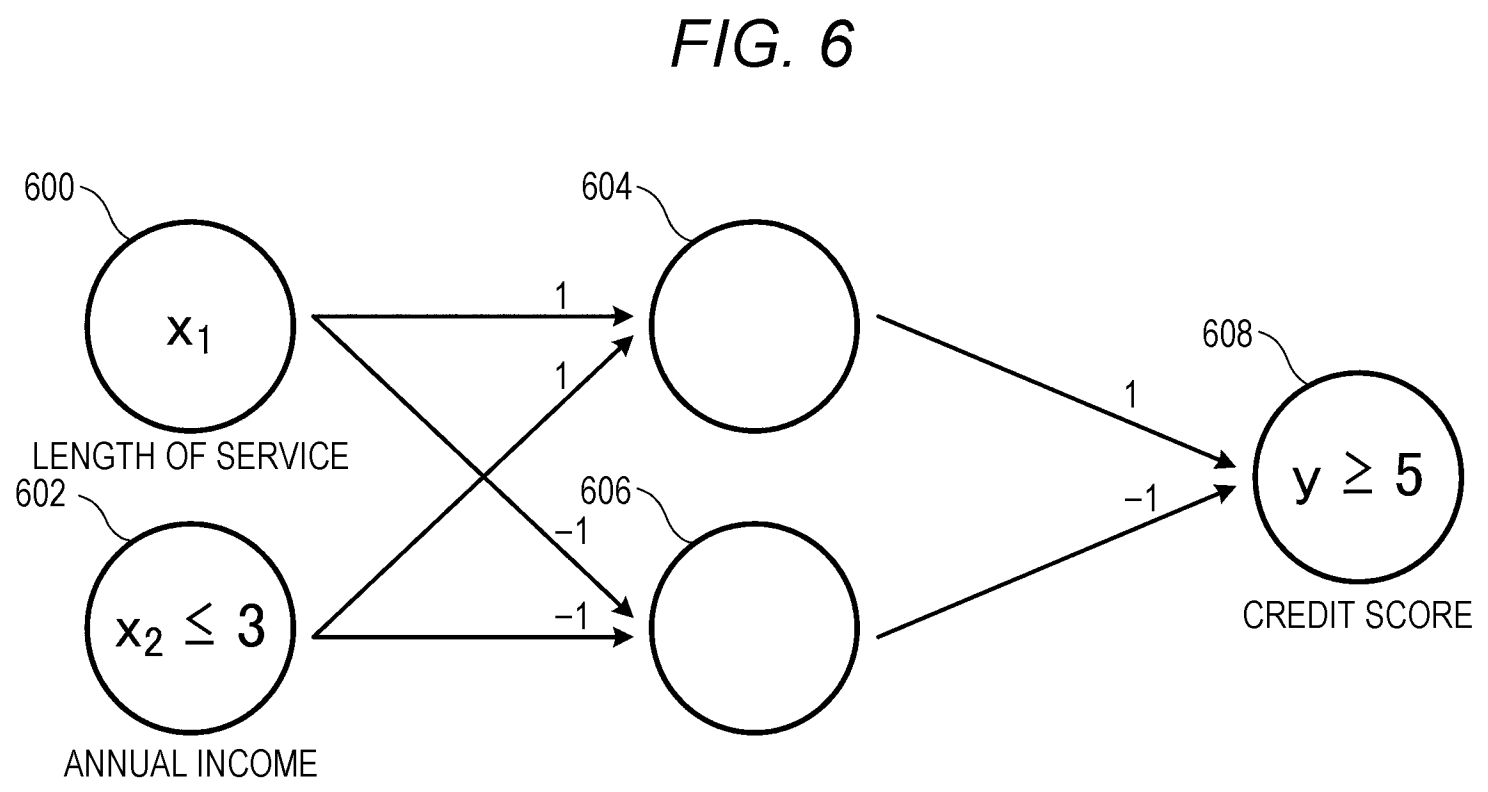

Next, verification of a model (deep neural network) using the formal verification according to the present embodiment will be described with reference to FIGS. 6 to 9. The formal verification ensures that a system is correct by, for example, mathematically proofing whether or not hardware and software satisfy a specific property. In the verification of the present embodiment, whether or not the deep neural network satisfies a specific property is verified by the formal verification FIG. 6 illustrates an example for describing a case where the formal verification is applied to a regression model. In the example illustrated in FIG. 6, nodes 600 and 602 represent neurons of an input layer. In addition, the nodes 604 and 606 represent neurons of an intermediate layer. Furthermore, a node 608 represents a neuron of an output layer. In the example of the regression model, the output layer outputs a predicted value (here, a credit score) corresponding to an input value. In addition, a numerical value associated with an arrow between nodes indicates a value of a weighting factor connecting the nodes. Note that, in this example, bias is omitted as 0, for simplification. In the example illustrated in FIG. 6, whether there is a combination of inputs $(x_1, x_2)$ where an output (prediction result) becomes 5 or more in a constraint that an input $x_2$ is 3 or less is verified. In this example, whether there is a set of a parameter indicating a length of service and a parameter indicating annual income for which the credit score is 5 or more is verified.

Figure 7:
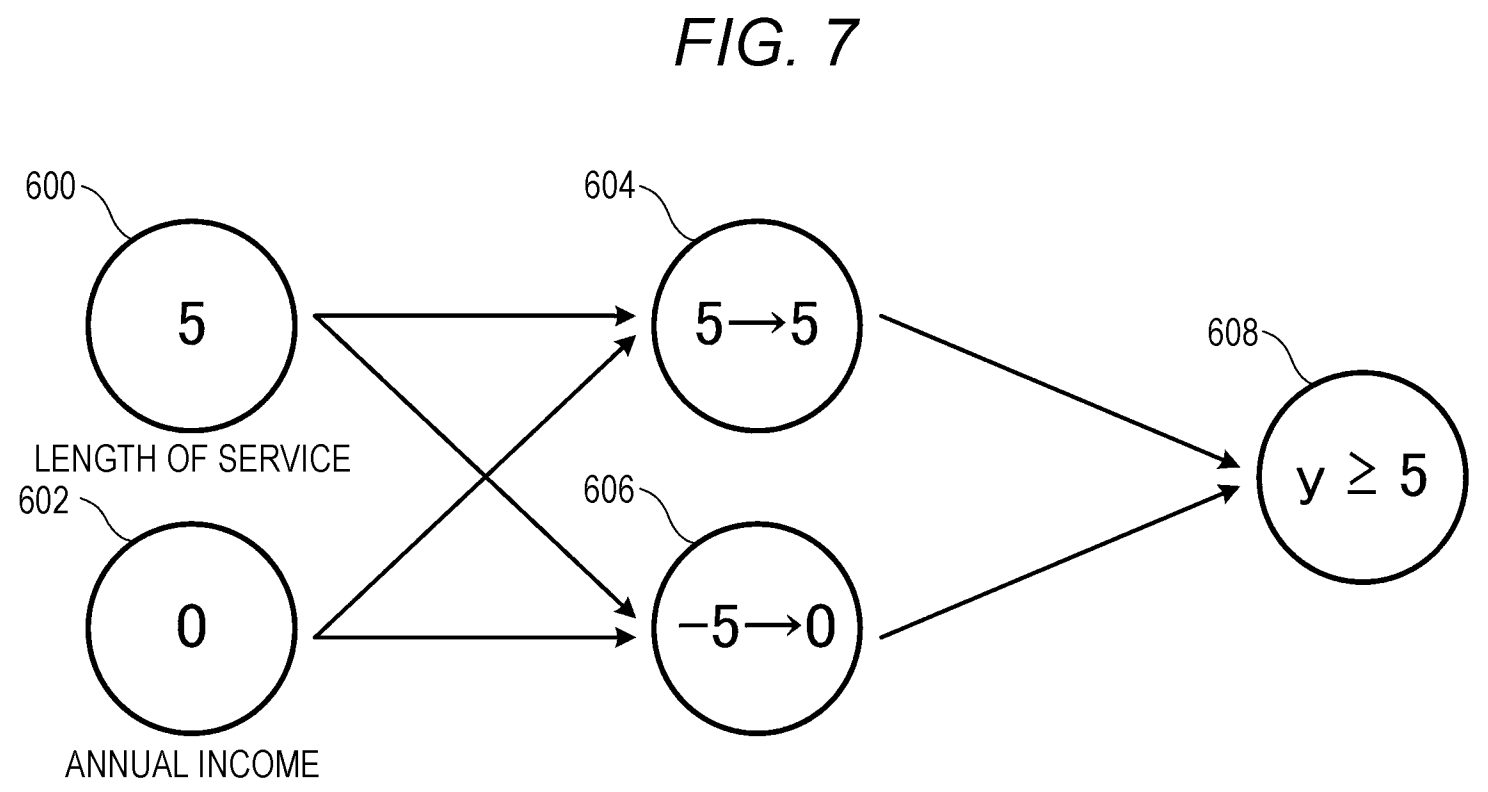

FIG. 7 illustrates an example of a case where there is a solution satisfying the above-described constraint. In a case where the set of $(x_1, x_2)$ is (5, 0), a sum of products of the input value and the weighting factor is calculated for each node, and calculation by an activation function (for example, ReLU) of the intermediate layer is performed for a calculation result, so that the credit score of 5 is obtained.

Figure 8:
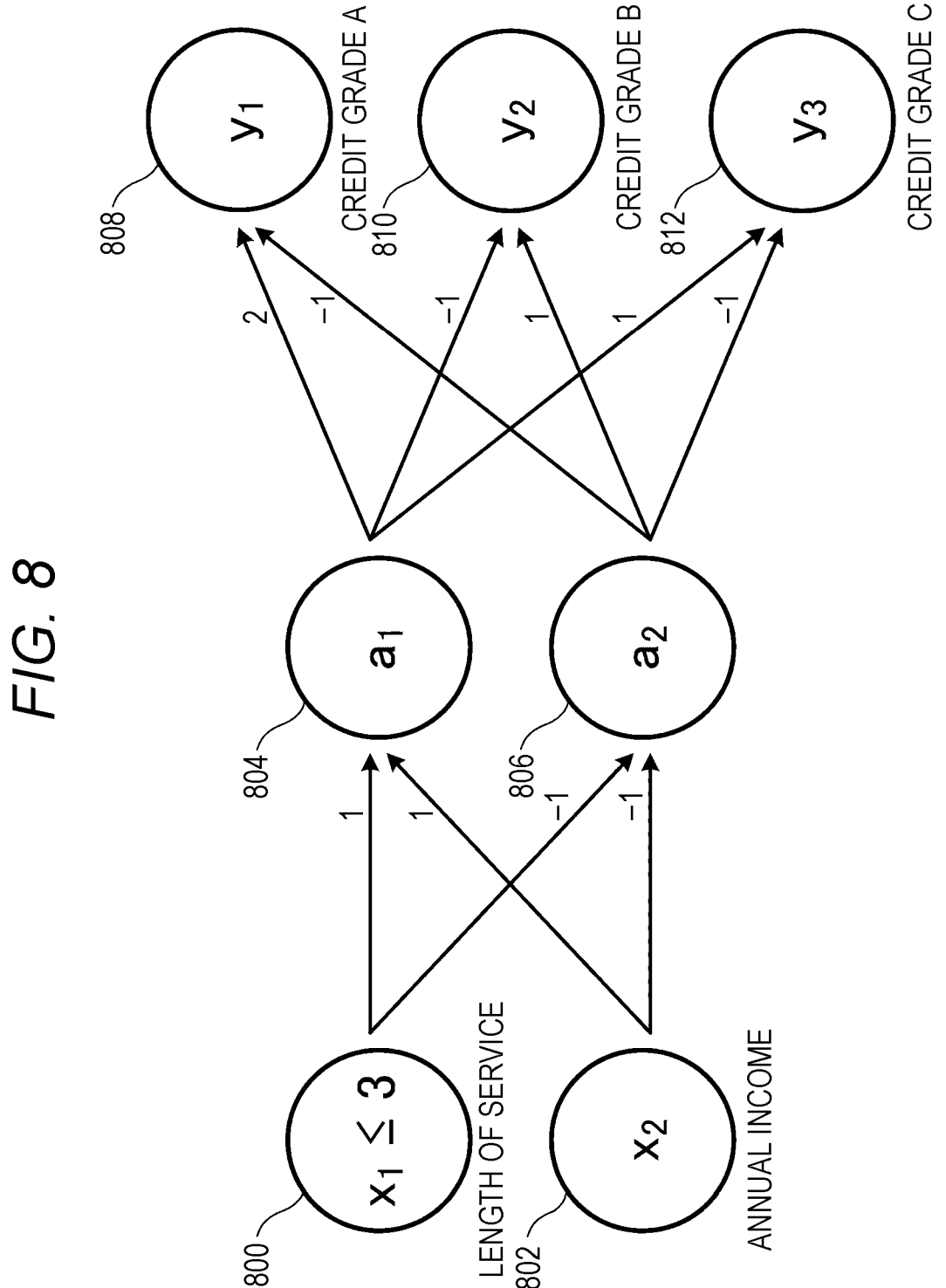
FIG. 8 is an example (1) for describing a case where formal verification is applied to a classification model.

FIG. 8 is an example for describing a case where the formal verification is applied to the classification model. In the example illustrated in FIG. 8, nodes 800 and 802 represent neurons of the input layer. In addition, the nodes 804 and 806 represent neurons of the intermediate layer. Furthermore, nodes 808, 810, and 812 represent neurons of the output layer. In the example of the classification model, the output layer outputs a class (here, a credit grade) into which the input value is classified. A numerical value associated with an arrow between nodes indicates a value of a weighting factor connecting the nodes. Also in this example, the bias is omitted as 0. In the example illustrated in FIG. 8, whether there is a combination of inputs $(x_1, x_2)$ that maximizes the value of the node 808 of the output layer in a constraint that an input $x_1$ is 3 or less is verified. In this example, whether there is a set of a parameter indicating a length of service and a parameter indicating annual income for which a probability of a credit grade A becomes highest is verified.

Figure 9:
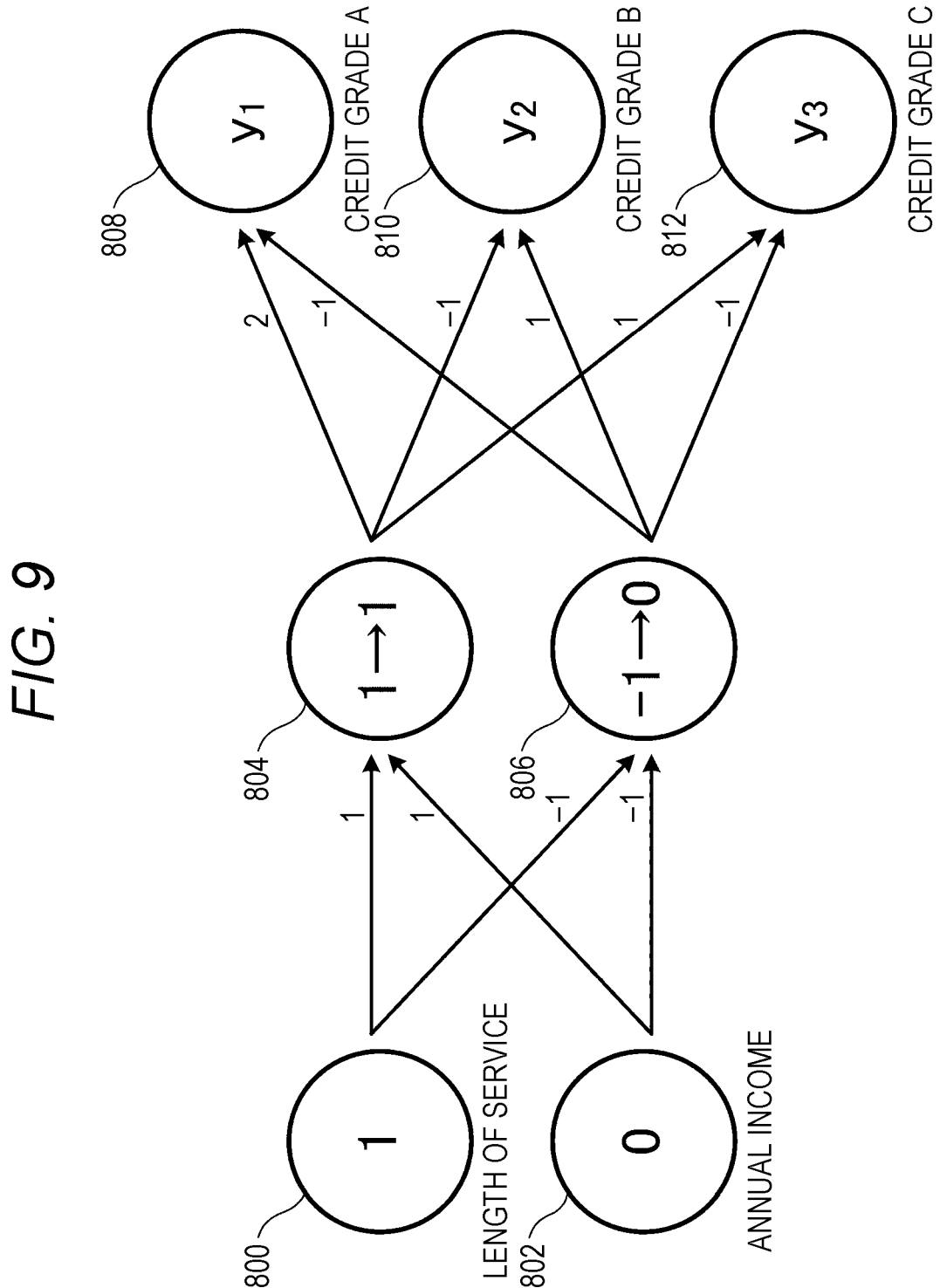
FIG. 9 is an example (2) for describing a case where formal verification is applied to a classification model.

FIG. 9 illustrates an example of a case where there is a solution satisfying the above-described constraint. In a case where the set of $(x_1, x_2)$ is (1, 0), a sum of products of the input value and the weighting factor is calculated for each node, and calculation by an activation function (for example, ReLU) of the intermediate layer is performed for a calculation result, so that the credit grade A becomes highest.

As can be grasped from the above example, it is possible to ensure that the learned generator does not generate the product G(z, c) classified into a class different from the designated class within a range of a specific input by setting that, as a property, the generative model does not generate an output that the classification model classifies into another class within the range of a certain norm of the noise vector z that has been the input of the product G(x, y) and proving the property. For example, the weighting factor illustrated as the classification model correspond to the weighting factor of the generator 521 and the classifier 522, and the constraint in the input corresponds to the range of the norm in the noise vector. Further, the classification of an output node corresponds to the output layer (classification result) of the classifier 522, and an output constraint corresponds to that a probability of a class other than the designated classification class is not the highest. As described above, by using the formal verification, the quality of the generator can be ensured in the neural network using the weighting factor of the generator and the classifier.

Functional Configuration Example of Information
Processing Device

Figure 3:
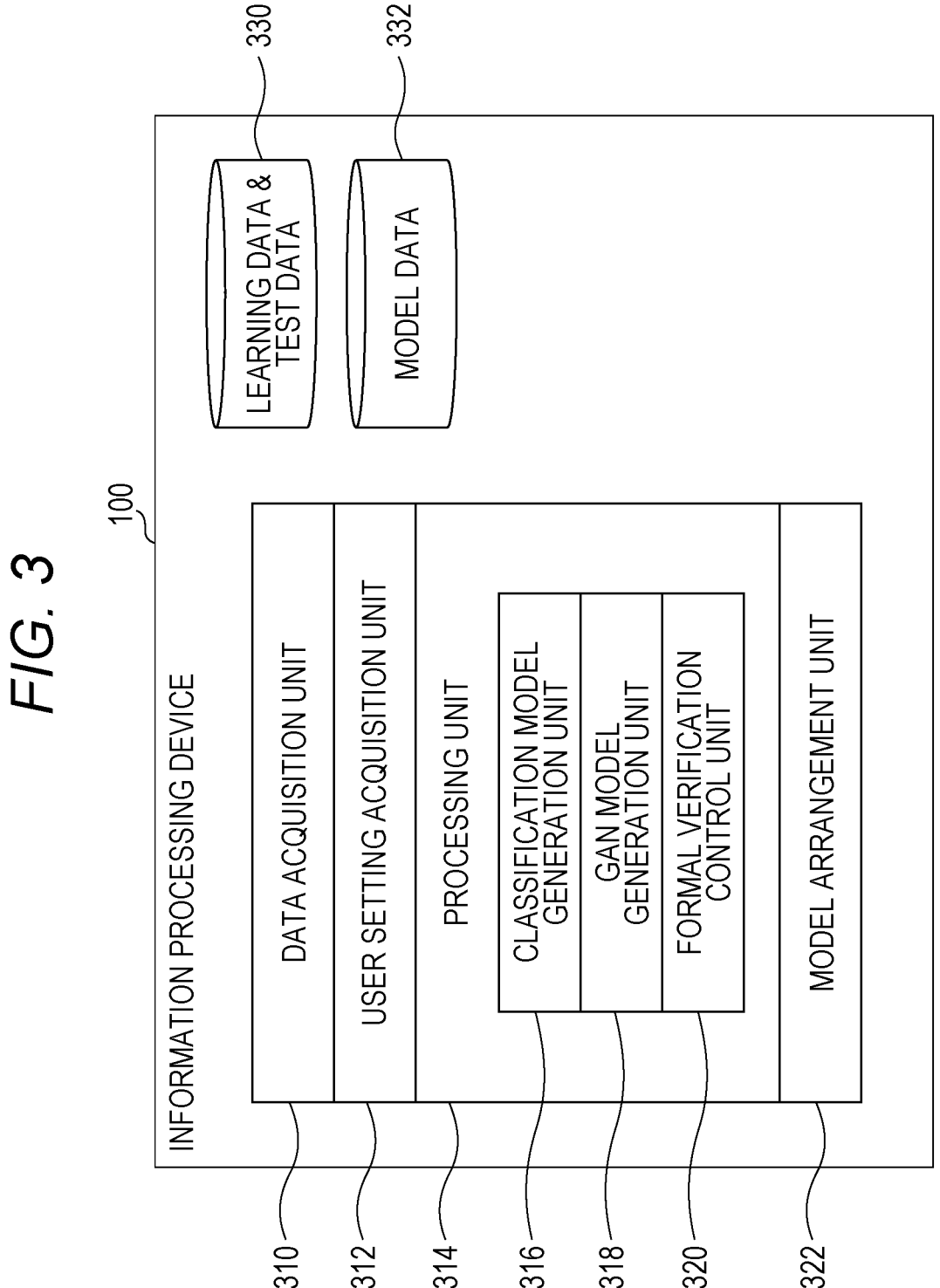
FIG. 3 is a block diagram illustrating a functional configuration example of the information processing device according to the present embodiment.

Next, a functional configuration example of the information processing device 100 will be described with reference to FIG. 3. The functional configuration example illustrated in FIG. 3 can be implemented by, for example, the processor 204 expanding and executing one or more programs stored in the storage 208 to the memory 202. Note that each of the functional blocks described in the present embodiment may be integrated or separated, and the described function may be implemented by another block. In addition, what has been described as hardware may be implemented by software, and vice versa.

A data acquisition unit 310 acquires, for example, learning data and test data. The learning data includes data for learning the generator that outputs data desired to be generated and data for learning the classifier 507. The learning data includes real data x in the CGAN learning. The real data x may also be used when learning the classifier 507. The learning data further includes data indicating a correct answer in the learning data when learning the discriminator 502.

The test data is data for evaluating (testing) whether the classifier 507 executes the classification processing with a desired accuracy when the classifier 507 is learned. The test data further includes data indicating a correct answer in the test data.

For example, the data acquisition unit 310 may receive these pieces of data transmitted from the communication terminal 102, or may acquire data stored in the storage 208 as the learning data, test data 330, and model data 332 in advance in response to a user instruction. Moreover, in a case where these pieces of data are stored in an external storage of the information processing device 100, the data may be acquired from the external storage in response to the user instruction.

A user setting acquisition unit 312 acquires user settings related to the GAN accuracy enhancement processing from the communication terminal 102, for example. The settings related to the GAN accuracy enhancement processing include, for example, a size (c) of the norm that ensures generation by the generator, the number of noise vectors, the number of epochs when the CGAN and the classifier are learned, settings of a learning rate, a learning algorithm, and the like, a threshold of a correct answer rate of the classification model with respect to the test data, and the like. The number of noise vectors represents the number of noise vectors that ensures accuracy. In the present embodiment, the specific noise vector z is associated with only the specific class c. Therefore, the user setting acquisition unit 312 can receive the setting of the number of noise vectors that ensures the accuracy for each class. The user setting acquisition unit 312 can separately accept the setting for the CGAN and the setting for the classifier regarding the numbers of epochs and the learning rates when the CGAN and the classifier are learned. The user setting acquisition unit 312 can receive designation of a gradient descent method, Adam, or the like as the learning algorithm used when the CGAN and the classifier are learned.

A processing unit 314 controls each unit of the information processing device 100 to control various operations of the information processing device 100. In addition, the processing unit 314 controls operations of a classification model generation unit 316, a GAN model generation unit 318, and a formal verification control unit 320 to implement the GAN accuracy enhancement processing.

The classification model generation unit 316 causes the above-described classifier 507 to be learned in accordance with the learning data acquired by the data acquisition unit 310 and the settings acquired by the user setting acquisition unit 312. In addition, when the learning of the classifier 507 ends by reaching the set number of epochs and the set correct answer rate, the classification model generation unit 316 evaluates how much the learned classifier 507 does not perform erroneous classification using the test data. In a case where an evaluation result of the classifier using the test data does not exceed a certain correct answer rate, the processing unit 314 may execute learning of the classifier 507 again and repeat the processing until the evaluation result using the test data exceeds the certain correct answer rate. At this time, the processing unit 314 may change at least one of the number of epochs, the learning rate, and the learning algorithm, and then repeatedly execute the learning of the classifier so as to obtain a higher correct answer rate. The classification model generation unit 316 stores data (for example, weighting parameters) of the learned classifier in, for example, the storage 208.

The GAN model generation unit 318 causes the generator 501 and the discriminator 502 of the CGAN to be learned on the basis of the user settings acquired by the user setting acquisition unit 312 and the learning data acquired by the data acquisition unit 310. The GAN model generation unit 318 terminates the CGAN learning by reaching the set number of epochs and the like. At this time, for example, in a case where a value of a loss function provided for the CGAN learning is not lower than a predetermined value, the processing unit 314 may execute the CGAN learning again. At this time, the processing unit 314 may change at least one of the number of epochs, the learning rate, and the learning algorithm, and then repeatedly execute the CGAN learning. The GAN model generation unit 318 stores data (for example, weighting parameters) of the learned generator in, for example, the storage 208.

In the neural network using the weighting factors obtained by the classification model generation unit 316 and the GAN model generation unit 318, the formal verification control unit 320 verifies (determines) that the generative model does not generate an output that the classification model classifies into another class within the range of a certain norm of a specific noise vector.

In a case where the formal verification control unit 320 completes the verification that the generator 521 does not generate an output that the classifier 522 classifies into another class within the range of the norm set from a specific noise vector, the processing unit 314 stores the specific noise vector, the class vector, and the norm in association with each other in, for example, the storage 208. Since the set of the noise vector, the class, and the norm, the quality of which is ensured by the generator, is specified by the GAN accuracy enhancement processing, the operation of the generative model can be ensured by applying the set of data to the generative model used in the inference stage.

For example, in a case where the generative model is used in the inference stage, a noise vector is given (for example, may be randomly selected or designated by the user). At this time, in a case where the given noise vector is included within the range of the norm of the noise vector in the set, the set of the noise vector, the class, and the norm associated with the norm can be provided to the generative model. As a result, when the generative model operates, execution of the generative model with ensured quality can be implemented by using the provided set of the noise vector, the class, and the norm.

A model arrangement unit 322 transmits data of the model (that is, the generator) for which the formal verification has been completed to the electronic device 101 and causes the electronic device 101 to deploy the model data, in response to a request from the electronic device 101 or in response to an operation of the administrator of the information processing device 100. The model arrangement unit 322 may transmit the set of data of the specific noise vector, the class vector, and the norm to the electronic device 101 together with the data of the model. As described above, the electronic device 101 uses the class vector and the norm associated with the noise vector when using the generator, so that generation of data belonging to the designated class is ensured.

The learning data and the test data 330 include learning data including correct answer data and test data. FIG. 11 illustrates an example of a data structure of the learning data and the test data 330 in a case where the CGAN generative model generates an image. The learning data and the test data 330 include a data ID, image data, a correct answer label, and a data type. The data ID indicates an identifier of data. The image data is image data of the learning data and the test data. In the example of FIG. 11, these pieces of image data are, for example, image data of a road captured by an in-vehicle camera. The correct answer label corresponds to a class, and as an example, a car, a person, a dog, or the like existing on the road is specified as the class. In addition, the correct answer label may be described in a form of One-Hot encoding independent of this data structure. The data type indicates whether the image data is used as the learning data or the test data. The data type may be randomly assigned at each time of learning so that a ratio between the learning data and the test data is constant or fixed. In addition, each of the test data and the learning data may have a data structure without providing a data type column.

The model data 332 includes data of the learned model of the generator 521 (data of a hyperparameter and a weighting factor related to the configuration of the neural network). In addition, the model data 332 may include the set of data (referred to as a noise data set) of the specific noise vector, the class vector, and the norm for which the formal verification by the formal verification control unit 320 has been completed. FIG. 12 illustrates an example of a data structure of the model data 332. The model data 332 includes a model ID, the weighting factor, the hyperparameter, and a plurality of noise data sets. The model ID is an identifier for identifying the neural network that is the generator. The weighting factor is a weighting factor obtained when the generator is learned. The hyperparameter may include data such as the number of layers of the generator, the number of nodes of each layer, and the structure of the network. The noise data set is a set of data of the specific noise vector, the class vector, and the norm verified by the above-described formal verification, and may be associated with the learned generative model. In the set of data of the specific noise vector, the class vector, and the norm, there may be a plurality of combinations of the noise vector and the norm for one class. In addition, in the noise data set, data of different classes (for example, a set for a class of a vehicle A and a set for a class of a human) may be associated with the model having the model ID of M001. As described above, by holding the learned generative model and the noise data set including the plurality of classes in association with each other and providing the noise data set to the electronic device 101, the electronic device can generate data belonging to the plurality of classes with accuracy using the generative model.

<Series of Operations of GAN Accuracy Enhancement Processing in Information Processing Device>

Figure 10:
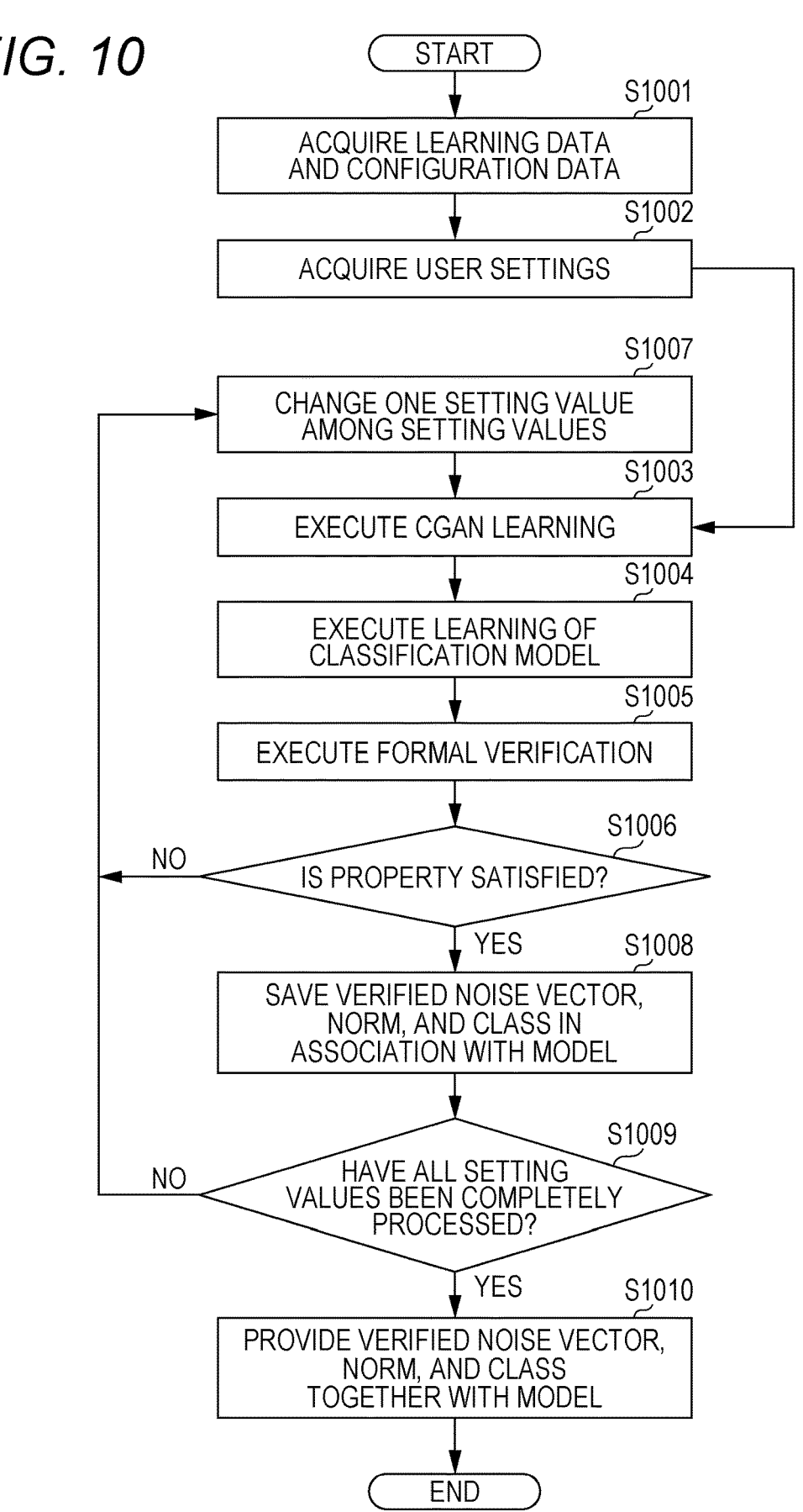
FIG. 10 is a flowchart illustrating an operation of GAN accuracy enhancement processing in the information processing device according to the present embodiment.

Next, a series of operations of the GAN accuracy enhancement processing executed in the information processing device 100 will be described with reference to FIG. 10. In addition, the present processing is implemented by the processor 204 expanding and executing a computer program stored in the storage 208 to the memory 202. In the following description, processing entities of steps will be collectively described as the processor 204 for easy description, but each unit such as the processing unit 314 executes corresponding processing in accordance with the processing content.

First, the processor 204 acquires the learning data and the configuration of the neural network (the hyperparameter and the like) (S1001), and then acquires the user settings (S1002). The order of the processing of S1001 and the processing of S1002 may be reversed, or both data may be acquired at a time from the communication terminal 102. As described above, the user settings include, for example, the size (c) of the norm that ensures generation by the generator, the number of noise vectors, the number of epochs when the CGAN and the classifier are learned, the settings of the learning rate, the learning algorithm, and the like, the threshold of the correct answer rate of the classification model with respect to the test data, and the like, but only some of the settings may be set.

Further, the processor 204 executes the CGAN learning on the basis of the learning data acquired in S1001 and the user settings acquired in S1002 (S1003). For a parameter that is not designated in the user settings, a default value may be set, and the parameter may be repeatedly executed while changing the value. The processor 204 executes the learning of the classification model on the basis of the learning data acquired in S1001 and the user settings acquired in S1002 (S1004).

Next, the processor 204 executes a formal verification algorithm using the generative model (generator 521) learned in S1003 and the classification model (classifier 522) learned in S1004 (S1005). As described above, in the formal verification according to the present embodiment, it is set as a property that an output that the classification model classifies into another class is not generated within the range of a certain norm of the noise vector z that has been an input of the product G(z, c) of the generator 521. The processor 204 automatically generates and executes a program code for verifying the property. Note that robustness evaluation by the formal verification can be implemented using a known technique. For example, it is possible to use a technique of verifying a property for a deep neural network using ReLU as an activation function described in a known document entitled "Reluplex: An Efficient SMT Solver for Verifying Deep Neural Networks" (Guy Kats, and three others, May 19, 2017, URL: https://arxiv.org/pdf/1702.01135.pdf).

As a result of executing the formal verification, the processor 204 determines whether the generator 521 and the Classifier 522 satisfy the property (S1006). In a case where it is determined that the property is satisfied, the processor 204 advances the processing to S1008, and otherwise, advances the processing to S1007. The processor 204 changes one of the setting values (S1007), and executes the processing of S1003 to S1005 again with the changed setting value. In S1007, in a case where the size of the norm is designated by the user, the processor 204 may change the size of the norm (that is, one setting value) from a small value to a large value each time S1007 is executed. In this way, it is possible to gradually increase the size of the norm while performing the formal verification by the processing of S1003 to S1005. Note that the number of verifications increases and the calculation cost increases as the value of the norm gradually increases, and thus, processing for suppressing the calculation cost may be performed, such as executing a binary search using the norm $\varepsilon*1.5$ as a threshold. Furthermore, the processor 204 may change the noise vector and the class vector and performs the formal verification for another noise vector and another class vector.

In addition, the processor 204 may repeat the processing of S1003 to S1005 while changing one of the settings while fixing the other settings among the plurality of user settings. It is often difficult for the user to grasp which setting value is selected to obtain the best result regarding the number of epochs, the learning rate, the learning algorithm, and the like for learning the model. Therefore, rather than performing setting by intuition or experience, it is more advantageous for the user to be able to specify a value with which a successful formal verification result can be obtained from among the results obtained by the processor gradually changing these setting values.

Next, in S1008, the processor 204 stores the noise vector z, the norm £, and the class c of when it is determined that the property is satisfied by the formal verification together with the weighting factor and the hyperparameter of the generator 521 as the generative model in the storage 208 as the model data 332.

In S1009, the processor 204 determines whether the processing of S1003 to S1005 has been executed for all of the setting values designated in S1002 or the setting values varied in S1007, and advances the processing to S1010 when the processing has been executed, or returns the processing to S1007 again when the processing has not been executed. The processor 204 provides the electronic device 101 with the model data obtained by the present processing, that is, the set of the noise vector z, the norm £, and the class c, the weighting factor of the generator 521, and the like. The processing of S1002 may be performed in response to a request from the electronic device 101 or an instruction from the communication terminal 102 by the user 103. Thereafter, the processor 204 terminates the series of operations of the present processing.

Note that the electronic device 101 can output a product with ensured quality by operating the generative model within the provided set of noise vector, norm, and class. For example, as an implementation example, in a case where designation of a class is received from a user of the electronic device 101, a noise vector within a corresponding norm range is randomly generated from noise vectors corresponding to the designated class, and a corresponding generative model is operated using the generated noise vector and the designated class as an input, whereby a desired product can be output. In the embodiment, the class designation is received from the user, but the class designation may not be received from the user. Meanwhile, since an available space of the noise vector is limited, variation of the product generated by the generative model is reduced. Therefore, when executing the generative model, the electronic device 101 may first generate a product using a random noise vector (without limitation of the above set), classify the product by the classification model, and operate the generative model within the range of the provided set of noise vectors, norm, and class in a case where the product is not classified into the designated class. In this way as well, the electronic device 101 can output the data of the designated class as a result.

As described above, in the present embodiment, by executing the CGAN learning algorithm, the generative model that generates data belonging to the designated class is learned on the basis of the noise vector and the designated class, and the classification model that classifies the input data based on whether the input data is in the designated class is learned. Then, by executing the formal verification algorithm, whether the model into which the classification model classifies the output of the generative model satisfies the property is determined. At this time, the property is set such that the generative model does not generate data classified into a class different from a first class designated for the generative model within the range of a certain norm of the noise vector input to the generative model. In this way, in the noise vector in a specific range, it is possible to ensure that the CGAN generative model does not generate data that the classification model classifies into another class. In other words, it is possible to improve the accuracy of generating data of the designated class in a case of generating data using the CGAN.

The invention is not limited to the above embodiment, and various modifications and changes can be made within the scope of the gist of the invention.

What is claimed is:

1. An information processing device comprising:
one or more processors; and
a memory including one or more programs, wherein the one or more programs causes, when executed by the one or more processors, the information processing device to execute:
training a generator neural network, which is a generative model that generates data belonging to a designated class on the basis of a noise vector and the class and a discriminator neural network, which discriminates whether the data generated by the generator is real data or not, by executing a learning algorithm of a conditional generative adversarial network and determining weight parameters of the trained generator neural network;
training a classification model that classifies input data based on whether the input data is in the designated class;
verifying whether a property is satisfied when the classification model classifies an output of the generative model by executing a formal verification algorithm wherein the formal verification algorithm guarantees that all possible data within a range of a certain norm of a noise vector belong to the designated class; and
generating training data belonging to the designated class by inputting a randomly generated noise vector within the verified range of the certain norm and the designated class into the generative model using the weight parameters of the trained generator neural network, and wherein
the property is that, within the range of the certain norm of the noise vector input to the generative model that uses the weight parameters of the trained generator neural network, the generative model does not generate data classified into a class different from a first class designated for the generative model.

2. The information processing device according to claim 1, wherein
the one or more processors causes the information processing device to further execute
storing a set of the noise vector, the norm, and the first class used for the determination in a storage in response to the determination that the property is satisfied.

3. The information processing device according to claim 1, wherein
the one or more processors causes the information processing device to further execute
storing a set of the noise vector, the norm, and the first class used for the determination in a storage in association with data of the learned generative model in response to the determination that the property is satisfied.

4. The information processing device according to claim 1, wherein
the one or more processors causes the information processing device to further execute
transmitting a set of the noise vector, the norm, and the first class used for the determination to an electronic device in association with data of the learned generative model in response to the determination that the property is satisfied.

5. The information processing device according to claim 1, wherein the one or more processors repeatedly execute the determining whether the property is satisfied while changing a size of the norm.

\* \* \* \* \*